US006909452B1

(12) United States Patent
Foster et al.

(10) Patent No.: US 6,909,452 B1
(45) Date of Patent: Jun. 21, 2005

(54) REMOTE VIDEO TELEPHONE SYSTEM

(75) Inventors: Ronald R. Foster, Los Gatos, CA (US); Raymond Wu, Saratoga, CA (US)

(73) Assignee: OmniVision Technologies, Inc., Sunnyvale, CA (US)

(*) Notice: Subject to any disclaimer, the term of this patent is extended or adjusted under 35 U.S.C. 154(b) by 476 days.

(21) Appl. No.: 09/536,894

(22) Filed: Mar. 28, 2000

(51) Int. Cl.[7] .................................................. H04N 7/14
(52) U.S. Cl. ................... 348/14.09; 348/14.11
(58) Field of Search .......................... 348/14.01–14.05, 348/14.07–14.09, 14.12–14.14, 14.16, 14.1; 340/310.01; 379/38

(56) References Cited

U.S. PATENT DOCUMENTS

| | | | | |
|---|---|---|---|---|
| 4,953,196 A | * | 8/1990 | Ishikawa et al. | 348/14.14 |
| 5,170,427 A | * | 12/1992 | Guichard et al. | 348/14.05 |
| 5,191,601 A | * | 3/1993 | Ida et al. | 348/14.01 |
| 5,237,602 A | * | 8/1993 | Lazik | 379/38 |
| 5,444,477 A | * | 8/1995 | Yamadera et al. | 348/14.07 |
| 5,684,826 A | * | 11/1997 | Ratner | 340/310.01 |
| 5,751,339 A | * | 5/1998 | Aramaki et al. | 348/14.13 |
| 6,020,916 A | * | 2/2000 | Gerszberg et al. | 348/14.01 |
| 6,094,213 A | * | 7/2000 | Mun et al. | 348/14.05 |
| 6,100,918 A | * | 8/2000 | Lu | 348/14.08 |
| 6,335,753 B1 | * | 1/2002 | McDonald | 348/14.01 |

FOREIGN PATENT DOCUMENTS

| | | |
|---|---|---|
| EP | 0 554 948 | 8/1993 |
| EP | 0 622 969 | 11/1994 |
| EP | 0 821 522 | 1/1998 |
| EP | 0 920 210 | 6/1999 |
| JP | 05030513 | 2/1993 |
| JP | 11069001 | 3/1999 |
| JP | 11298869 | 10/1999 |

OTHER PUBLICATIONS

European Search Report Application No. 00311100.2–2202 dated Oct. 9, 2002.

* cited by examiner

*Primary Examiner*—George Eng
(74) *Attorney, Agent, or Firm*—Perkins Coie LLP

(57) ABSTRACT

The remote video phone system comprises a base video unit, at least one remote video unit and a circuit configured to allow the base unit and one or more remote video units to communicate with one another or a standard external telephone line. The base unit comprises a video image device for capturing a sequence of video images, a microphone, a speaker, a user interface control pad, a circuit configured to control a network structure between the base unit remote and the remote video units, a means for providing video and audio communication between the base unit and the remote video units, and a circuit configured to allow the base unit to connect between a existing telephone and a standard PBX telephone line. The base unit can also be configured to operate as a stand-alone telephone. The remote video unit comprises a circuit configured to allow video and audio communication between the remote video unit and the base unit, a circuit configured to receive network commands from the base video unit, a video image device for capturing a sequence of video images, a microphone, a speaker, and a user interface control pad. The video phone can also be configured to operate as a remote security monitoring system.

11 Claims, 7 Drawing Sheets

REMOTE VIDEO TELEPHONE SYSTEM

TECHNICAL FIELD OF THE INVENTION

The present invention generally relates to video telephones, and more particularly, to a video telephone system having a plurality of video devices.

BACKGROUND OF THE INVENTION

Videophone systems are known in the telecommunications industry. With the recent development of new compression techniques over standard telephone lines, it has now become possible to effectively transmit and receive video images over a standard telephone line. Many technological developments have contributed to the development of this growing industry. For example, improvements in communication standards have increased transmission rates to the order of 56 Kbps to 64 Kbps. Other developments in imaging equipment have also contributed to the development of video telephones, such as the development of single-chip CMOS image sensors by OmniVision Technologies of Sunnyvale, Calif., the assignee of the present invention.

With the newly developed technology, many video telephones have been proposed by combining a video image capturing device, a standard video display unit, and the appropriate circuitry to provide video and audio communication between two like devices over a standard telephone line. Examples of several video telephone designs are described in U.S. Pat. No. 4,953,196 to Ishikawa et al. (the "Ishikawa patent") and U.S. Pat. No. 5,191,601 to Ida et al. (the "Ida patent"). These references disclose commonly known video telephones and several developments related to enhancing image quality and camera mounting features.

One fundamental problem with traditional videophones is that they require a user to remain in one physical location while using the video and audio capabilities of the videophone. For example, if a user wants to make a phone call, the user has to remain in the viewing area of the video camera and at a distance that allows them to view the video display. In typical home video phones, as shown in the Ida patent, the video camera is affixed to the base device. In other special designs, such as the phone disclosed in the Ida patent, certain video phones have a flexible video camera mount, one that allows a user to change the direction of the camera's viewing area. However, even when a video phone has a camera capable of viewing multiple viewing directions, the operator of the video phone may be unable to move away from the base unit without moving out of the camera's viewing area. Moreover, this system may not operate for users who would like to transmit images from multiple viewing areas, such as transmitting images from multiple rooms in a building.

In addition, as shown in the above-described examples, traditional videophones typically include a telephone part having telephone functions, a line control circuit coupled to a public analog telephone line and other audio communication devices, such as a speaker and microphone. These built in features add cost to the development and manufacturing of each device and, further, do not provide the flexibility for an operator to use their existing telephone with the videophone unit.

DETAILED DESCRIPTION OF THE PREFERRED EMBODIMENT

The present invention relates to a remote video telephone system having a base video unit that is communicatively linked to at least one remote video unit. The remote video telephone system allows a user of the remote video units to communicate with the base video unit or a similar video telephone system communicatively linked through a standard telephone connection. The video telephone system also provides other telephone operations to allow users of the base video unit or remote video units to communicate to other ordinary telephones that are communicatively linked through a standard telephone connection. In one embodiment, the base video unit is configured to connect between a standard telephone and a standard telephone wall jack linked to a PBX switch. In this embodiment, the base video unit utilizes the standard telephone for standard telephone operations, such as, audio communication and dialing functions. In another embodiment, the base video unit is configured to connect directly to the wall jack to operate as a stand-alone unit or to operate in parallel with a standard telephone. The present invention also provides other embodiments where the remote videophone system is configured to receive camera control commands from another video telephone system. These embodiments allow the remote video telephone system to operate as a remote video monitoring system.

Figure 1A:
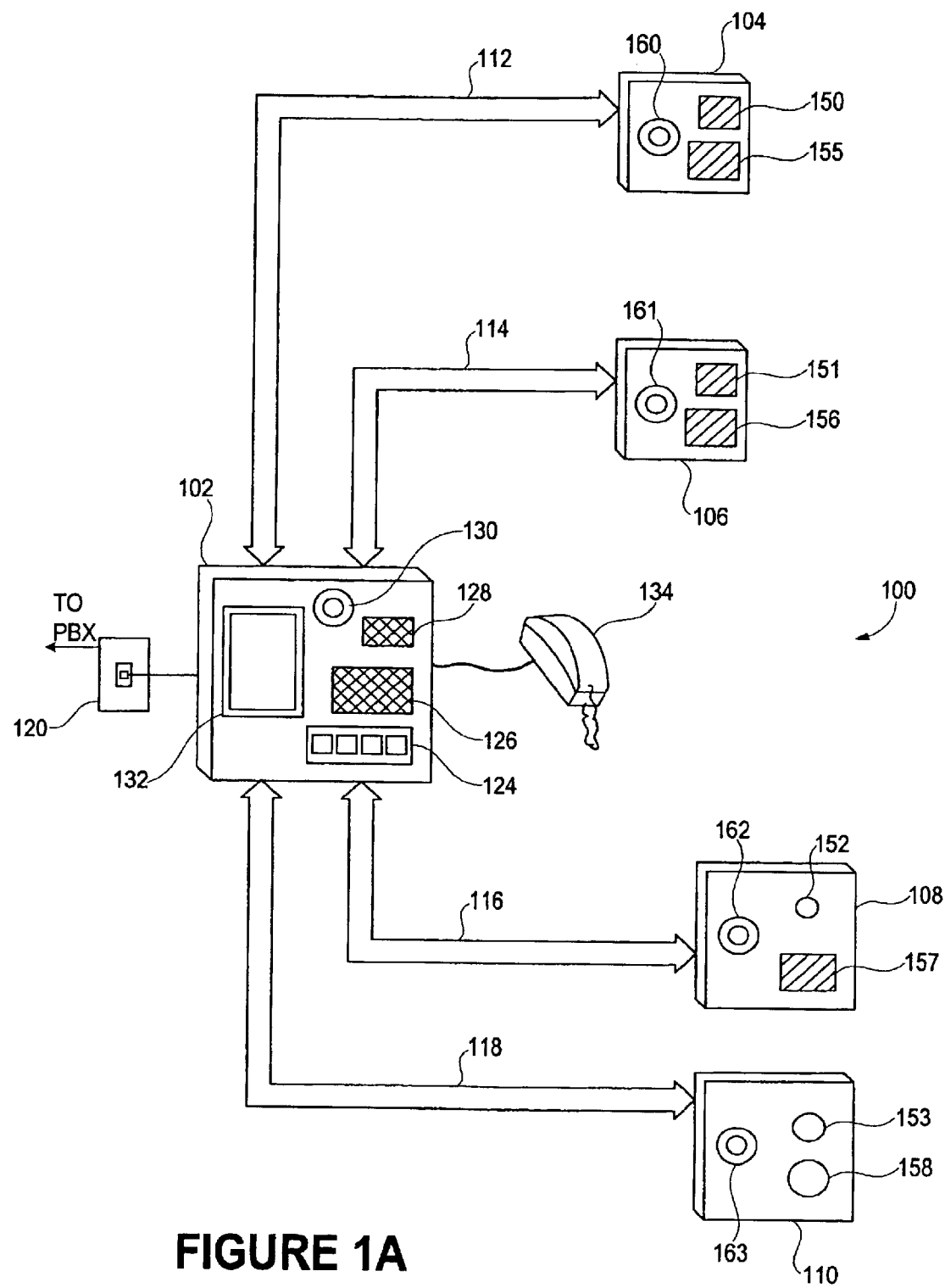
FIG. 1A is a system block diagram showing an embodiment of a video telephone system formed in accordance with the present invention.

FIG. 1A illustrates a system block diagram of one embodiment of the present invention. The remote videophone system 100 comprises a base video unit 102, a plurality of remote video units 104, 106, 108, and 110, and a plurality of data channels 112, 114, 116, and 118 to allow the base unit 102 to communicate with the respective remote video units 104–110. The base video unit 102 is also adapted to communicate with a standard external telephone line 120, where the telephone line 120 is connected to a commercial PBX or like telephone switch. The data channels 112–118 and the base video unit 102 also allow the remote video units 104–110 to communicate with the external telephone line 120. The base video unit 102 also comprises the necessary circuitry to allow the base unit 102 to electronically communicate with a common telephone 134. This circuitry allows an operator of the remote videophone system 100 to use the telephone 134 for general dialing functions and audio communications.

In one embodiment, the base video unit 102 also comprises a video capturing unit 130, a video display screen 132, at least one microphone 128, at least one speaker 126, and a user control panel 124. Each remote video unit also comprises video capturing units 160–163, microphones 150–153, and speakers 155–158.

Figure 1B:
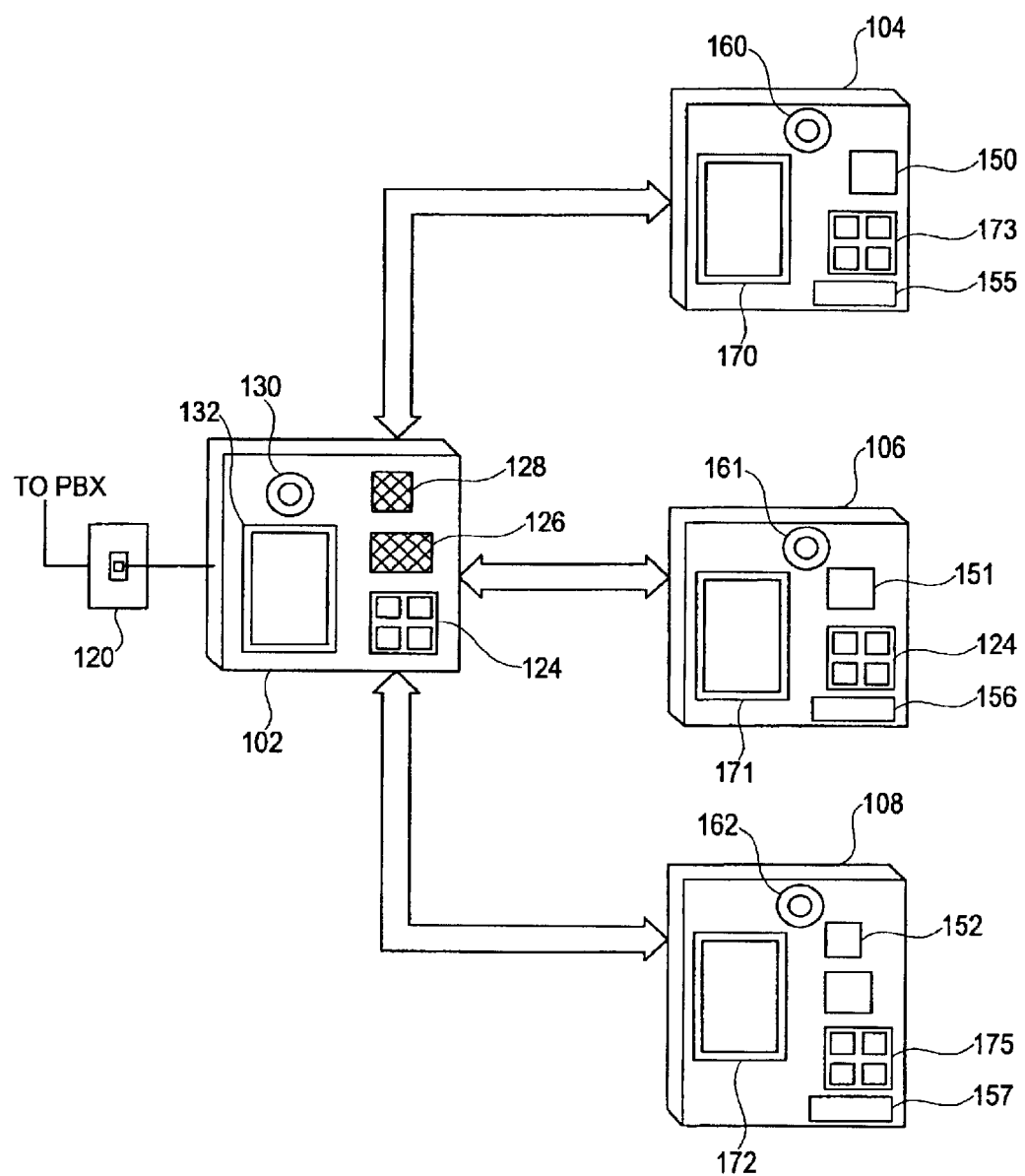
FIG. 1B is a system block diagram showing an alternative embodiment of a video telephone system formed in accordance with the present invention.

Another embodiment of the present invention is shown in FIG. 1B, where the remote video units 104, 106, and 108 may also comprise a video display screen 170–172 and a user control panel 173–175. The data channels 112–118 in the system 100 may be made from a variety of communications means. In one embodiment, the data channels 112–118 comprise a hard wire configuration. In this embodiment, the system would include the necessary circuitry to use a standard metallic conductor to provide the electronic communication between the base unit 102 and each of the remote video units 104–110. A specific example of this embodiment involves the use of the power line electronics.

Figure 5:
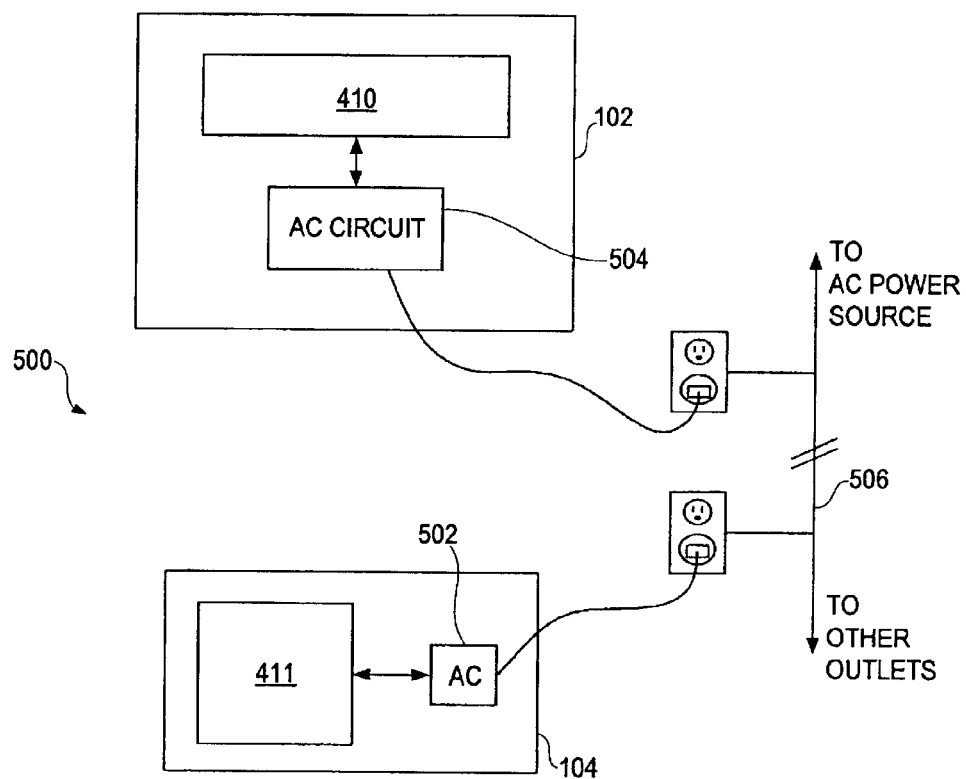
FIG. 5 is a system block diagram showing an exemplary configuration of a system using the present invention.

As shown in FIG. 5, one embodiment of the present invention utilizes standard AC power lines in a building as a link for the data channels 112–118. As shown in FIG. 5, the base unit 102 houses a first AC circuit 504, and the remote video unit 104 houses a second AC circuit 502. The two AC circuits 502 and 504 communicate through a power line system 506. The circuitry for the AC circuits 502 and 504 are known in the art and the components of each circuit are commercially available.

In another embodiment, the data channels 112–118 may involve a wireless system. In this embodiment, the circuitry used in a standard wireless telephone can be used to provide the electronic communication between the base unit 102 and each of the remote video units 104–110. One example of this embodiment may involve the use of 900 MHz spread spectrum technology. In yet another embodiment, the data channels 112–118 may involve a computer network configuration. In this embodiment, the system can use computer network circuitry to comminute the audio and video data by using a network protocol such as TCP/IP.

In each embodiment involving the various data channel configurations, the circuitry should be configured to allow the base video unit 102 to communicate with each remote video unit 104–110, individually or collectively. One channeling apparatus is described in more detail below in conjunction with the embodiment illustrated in FIG. 5. In addition, the bandwidth of each data channel 112–118 shall be sufficient to accommodate the transmission of video and audio data from the remote video units 104–110 to the base video unit 102 and to carry the two-way control signals between the remote video units 104–110 and the base video unit 102.

The user control panel 124 contains a key pad to allow the system operator to use the base video unit 102 as a stand-alone telephone. In one embodiment, the user control panel 124 contains a standard DTMF 12-key pad, an off-hook/on-hook status switch, a speaker volume control, a microphone volume control, and a brightness control dial for the video display screen. The base video unit 102 also provides the switching and addressing necessary for the user to choose the camera device to be used with the existing telephone touch pad. For example, an operator can use the 12-key pad of the ordinary telephone 134 to control which remote video unit 104–110 communicates with the base video unit display screen 132.

The video capturing units 130 and 160–163 in each video unit 102 and 104–110 are preferably made from a miniaturized, single-chip image capturing device. For example, the base unit can use a single-chip CMOS image sensor manufactured by OmniVision Technologies of Sunnyvale, Calif. The image capturing device can be configured to capture still video images or sequential video frames, e.g. a video sample rate of at approximately 30 frames per second.

In one embodiment, the video display screen of each video unit can consist of standard color or black and white LCD screens. In another embodiment, the video display screen can consist of an LCD screen with touch screen capabilities. These touch screen capabilities can replace or work in conjunction with the user control panels 124, 173–175 of each video unit.

Figure 2A:
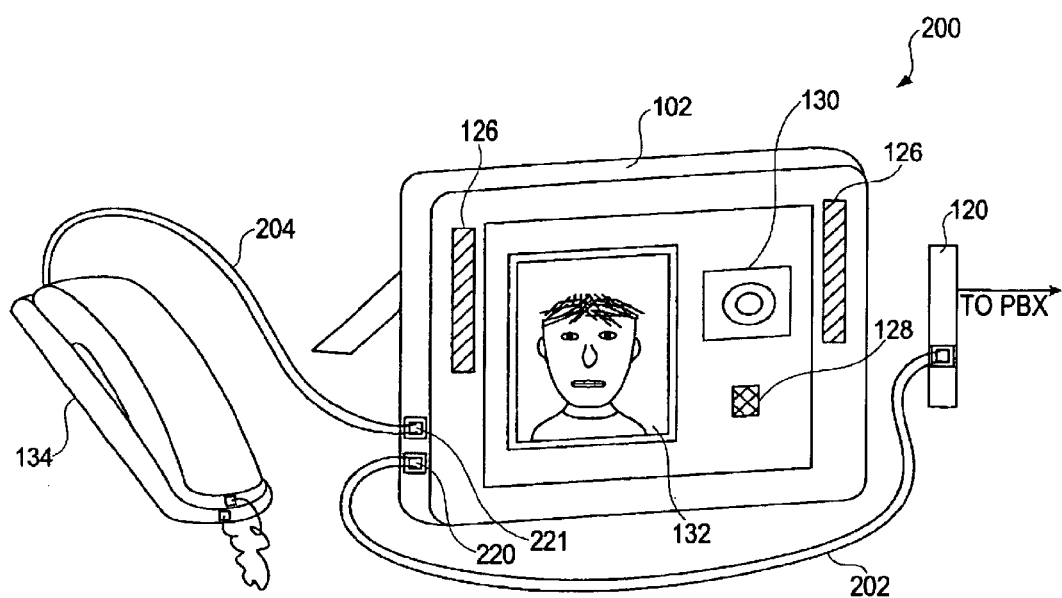
FIG. 2A is a perspective view of one embodiment of the base video unit.

FIG. 2A is a perspective view of one embodiment of the base video unit 102 according to the present invention. The base video unit 102 comprises a video image capturing device 130 for capturing a sequence of video images, a microphone 128, a speaker set 126, a video display screen 132, and a circuit configured to control a network structure between the base video unit 102 and the remote video units, a means for providing video and audio communication between the base unit and the remote video units, a circuit configured to allow the base video unit 102 to connect between a existing telephone 134 and a standard PBX telephone line 120, and two telephone sockets 220 and 221. Socket 220 is used for connecting a telephone network to the base video unit 102 and socket 221 is used for connecting a local telephone to the base video unit 102. In this embodiment, the circuitry connecting the two sockets 220 and 221 provide a switch so that an operator of the video telephone can use the existing telephone 134 for dialing functions. The switch involved to connect the two sockets 220 and 221 provides a parallel electronic connection between the phone jack 120, the existing telephone 134, and the base unit circuitry. In this configuration, the existing telephone 134 and the base video unit 102 can be used in an off-hook status while both communicating the telephone network.

Figure 2B:
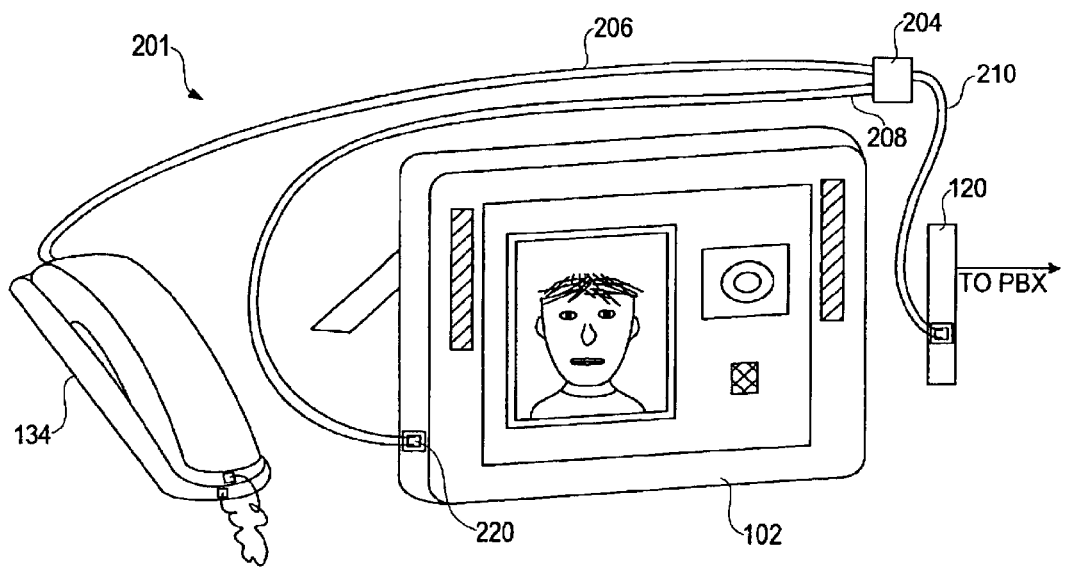
FIG. 2B is a perspective view of an alternative embodiment of the base video unit.

FIG. 2B is a perspective view of another embodiment of the base video unit 102. In addition to comprising the same components 126–132 of the embodiment of FIG. 2A, the embodiment of FIG. 2B comprises an internal circuit that allows the base video unit 102 to connect to a Y-connector telephone bridge 204. This internal circuit that allows the connection of the Y-connector is known in the art. Thus, this configuration only has one socket 220 for connecting the telephone network to the base video unit 102. Like the embodiment of FIG. 2A, the switch involved to connect the two sockets 220 and 221 provides a parallel electronic connection between the phone jack 120, the existing telephone 134, and the base unit circuitry. In this configuration, the existing telephone 134 and the base video unit 102 can be used in an off-hook status while both communicating the telephone network. The embodiments shown in FIGS. 1A and 1B allow the video telephone to communicate through one telephone line. This feature simplifies the installation and allows the user to use an existing phone with the video unit.

Figure 2C:
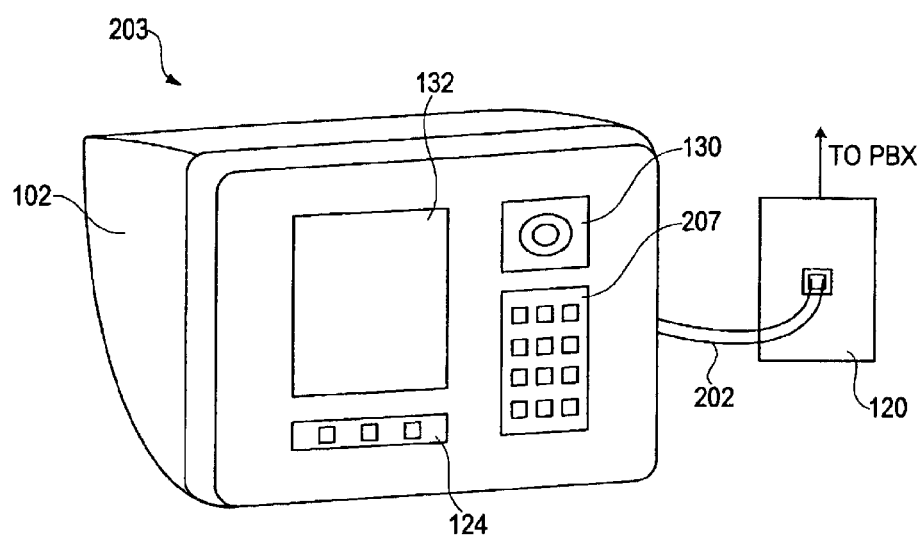
FIG. 2C is a perspective view of yet another alternative embodiment of the base video unit.

FIG. 2C is a perspective view of yet another embodiment of the base video unit 102. In the embodiment of FIG. 2C, the base video unit 102 comprises all of the components of the embodiment of FIG. 2B plus a plurality of digit keys 207 and function keys 124. The plurality of digit keys 207 are used for the standard dialing functions. This embodiment allows a user to use the base video unit 102 as a stand-alone telephone unit or as a video system in conjunction with a standard telephone. In addition, the plurality of digit keys 207 can be used to activate and deactivate the remote video units 104–110.

Figure 4:
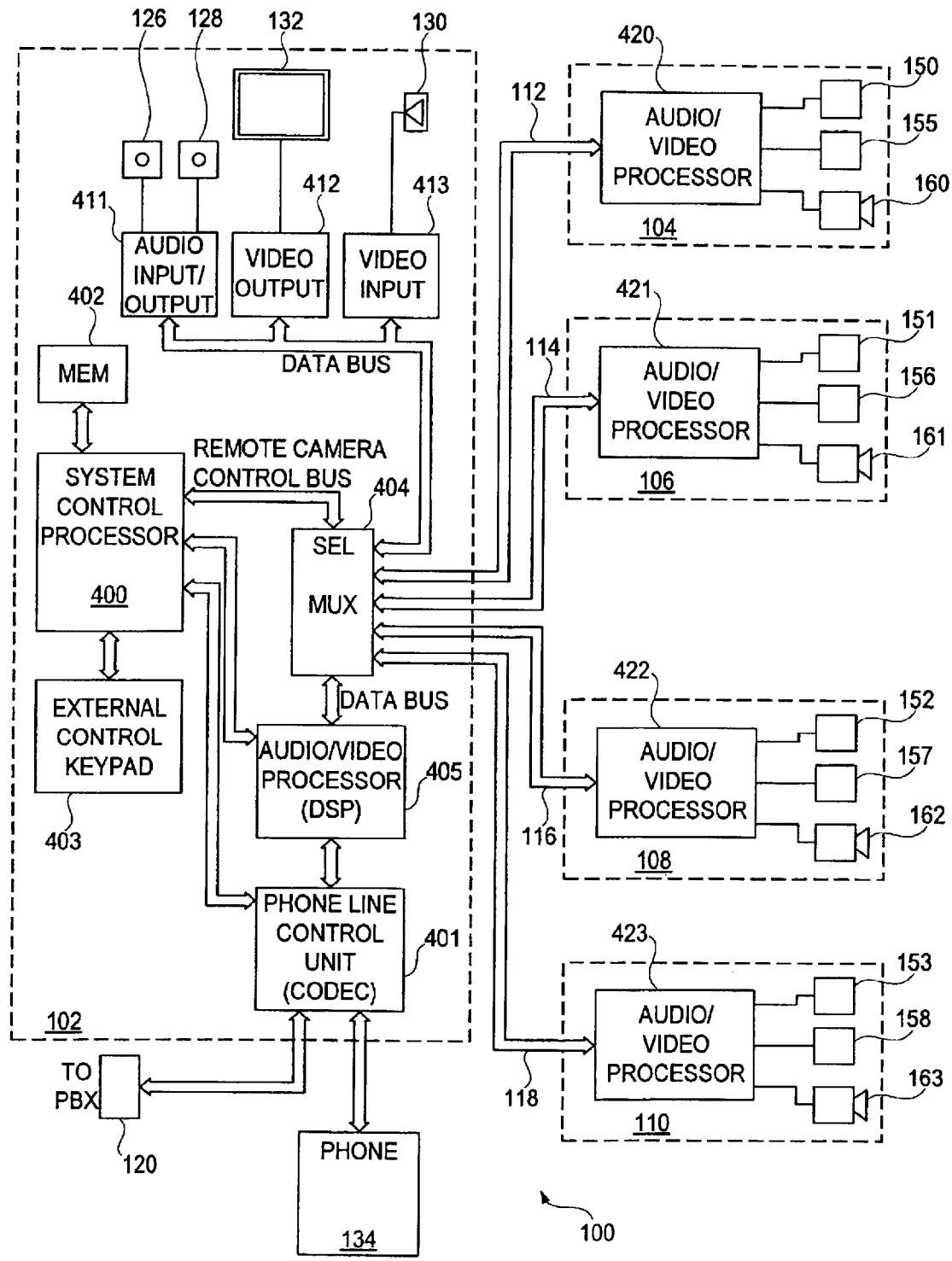
FIG. 4 is a system block diagram showing the video telephone system of FIGS. 1A and 1B in more detail.

As shown in FIG. 4, a multiplexer 404 is configured to receive channel information from the plurality of digit keys 207. The function keys 124, are used for on-hook/off-hook status control and other functions such as speaker volume and LCD brightness control.

In the operation of the remote video phone system 100, the internal circuitry is configured to allow the base video unit 102 to connect to the external phone line after a standard telephone 134 establishes a connection with the external phone line. The remote videophone system 100 also allows an operator to answer the remote videophone system 100 by actuating one of the function keys 124, 173–175 on the base video unit 102 or any one of the remote video units 104–108.

Figure 3A:
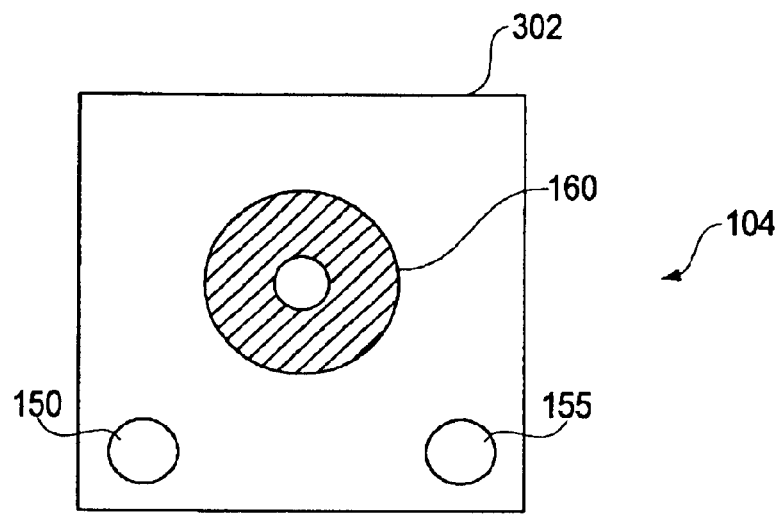
FIG. 3A is a front view of one embodiment of the remote video unit.
Figure 3B:
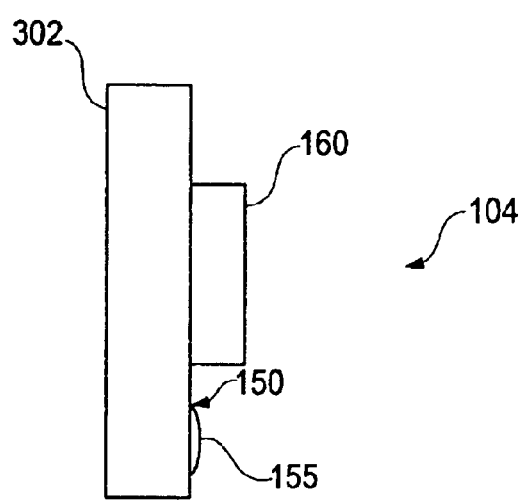
FIG. 3B is a side view of the remote video unit of FIG. 3A.

FIGS. 3A–3B illustrate a front and side view of one embodiment of the remote video unit 104, respectively. The remote video unit 104 comprises a housing 302, a video capturing unit 160, at least one microphone 150, and at least one speaker 155. The remote video unit 104 is of a relatively small size such that it can be fit into small areas.

FIG. 4 is a system block diagram showing the video phone system 100 of FIGS. 1A–1B in more detail. The base video unit 102 comprises a microprocessor 400 for controlling the operations of the video phone system 100, a digital signal processor (DSP) 405 connected to the microprocessor 400 for processing voice signals under the control of the microprocessor 400, a memory 402 for storing the functional settings of the video phone system 100, a codec (coder/decoder) 401 for encoding analog voice signals transmitted to and from the external line 120 and decoding the digital voice signals from the DSP 405, a multiplexer 404 for controlling the data channels 112–118, a display circuit 412 connected to the multiplexer 404 for controlling the display screen 132, an external keypad 403 connected to the microprocessor 22 for controlling the dialing functions, line controls, and multiplexer 401, an audio control circuit 411 for transmitting the analog voice signals between the speakers 126–128 and the DSP 405, and a video input circuit 413 for transmitting the video image captured by the video camera 130 to the DSP 405.

One novel feature is the channeling component of the multiplexer 404. By the control of the external keypad 403 or by the use of a keypad operatively communicating through the telephone network 120, an operator can enable or disable each of the remote video units 104–110 independently. The addressing configuration of the multiplexer 404 is known in the art.

The telephone 134 is connected to the codec 401, which is provided with switches to establish a communication channel between both the telephone 134 and the audio and video signals of the DSP 405. This allows the user to operate both the base video unit 102 and the telephone 134 by viewing video images on the display screen 132 and by talking through the telephone 134.

Since the remote video units 104 are designed to be placed in various locations in a building, the video phone system 100 can also operate as a remote monitoring system. For example, a remote operator can monitor his or her home by calling the base unit 102 from a video telephone system located at a remote location. Once the two systems complete a connection over the telephone line, the user would be able to enter a code and then enable each remote video unit 104–110 by the use of the remote key pad. So, a homeowner would be able to view various rooms in a building remotely.

As will be understood by those familiar with the art, the present invention may be embodied in other specific forms without departing from the spirit or essential characteristics thereof. For example, other configurations utilizing a different number of cameras and using different image capturing devices could be used. Accordingly, the disclosure of the preferred embodiment of the present invention is intended to be illustrative, but not limiting, of the scope of the invention which is set forth in the following claims.

We claim:

1. A video phone system comprising:

a base video unit having a video display screen, a microphone, and a speaker;

at least two remote video units that selectively provide audio and video signals to said base video unit;

a multiplexer associated with said base video unit, said multiplexer unit capable of being controlled by a caller for selecting a selected one of said audio and video signals from said at least two remote units or said base video unit, such that upon a selection input from said caller, said selected one of said audio and video signals is automatically routed through said base video unit to said caller without the need for human intervention; and a first circuit for allowing the base video unit and the selected one of said remote video units to electronically communicate with a standard external telephone line, said first circuit adapted for routing said selected one of said audio and video signals out through said standard external telephone line, further wherein the base video unit and the remote video unit both include a communication means for allowing the base video unit and the remote video unit to electronically communicate with one another.

2. The video phone system of claim 1, further comprising:

a telephone part having telephone functions; and a second circuit housed in the base video unit for allowing the base video unit to electronically communicate with the telephone part.

3. The video phone system of claim 2, wherein the second circuit is also configured to provide electronic communication between the telephone part and the standard external telephone line.

4. The video phone system of claim 2, wherein the base video unit further comprises:

an input image device for capturing input image data to be transmitted;

a third circuit for digitizing the input image data into digital image data;

a fourth circuit for producing an output image signal based on a received digital image data;

said video display screen for displaying an image of the output image signal; and a line control circuit coupled to a public analog telephone line for selectively coupling the third circuit and the telephone part to the public analog telephone line.

5. The video phone system of claim 1, wherein the remote video unit, comprises:

a video capturing unit, for capturing image data to be transmitted to the base video unit;

a microphone for capturing audio signals to be transmitted to the base video unit;

a speaker for playing audio signals received from the base video unit; and a housing, wherein the video capturing unit, the microphone, and speaker are contained therein.

6. The video phone of claim 1, further comprising:

a telephone part having telephone functions;

a line control circuit, housed within the base video unit;

an external connector coupled to a public analog telephone line for coupling the public analog telephone line to the telephone part and the line control circuit.

7. The video phone of claim 1 in which the communication means is provided by a network controlled by a TCP/IP protocol.

8. The video phone of claim 1 in which the communication means is provided by a communications circuit comprising:

a first AC circuit housed in the base video unit;

a second AC circuit house in the remote video unit for communicatively connecting the first and second AC adapter circuits, wherein the first and second AC circuits are adapted for communicating over a power source.

9. The video phone of claim 1 in which the communication means is provided by a wireless system comprising a first transmitter housed in the remote video unit and a receiver housed in the base video unit.

10. The video phone of claim 1 wherein said selection input is a code entered into a remote keypad by said caller.

11. A video phone system comprising:

a base video unit having a video display screen, a microphone, and a speaker;

at least two remote video units that selectively provide audio and video signals to said base video unit;

a multiplexer associated with said base video unit, said multiplexer unit capable of being controlled by a caller for selecting a selected one of said audio and video signals from said at least two remote units or said base video unit, such that upon a selection input from said caller, said selected one of said audio and video signals is automatically routed through said base video unit to said caller without the need for human intervention, said selection input being a code entered into a remote keypad by said caller; and a first circuit for allowing the base video unit and the selected one of said remote video units to electronically communicate with a standard external telephone line, said first circuit adapted for routing said selected one of said audio and video signals out through said standard external telephone line, further wherein the base video unit and the remote video unit both include a communication means for allowing the base video unit and the remote video unit to electronically communicate with one another, said communication means being a hard-wired network.

* * * * *